United States Patent [19]

Hermann et al.

[11] 4,247,470
[45] Jan. 27, 1981

[54] PROCESS FOR ISOLATING TRIARYLMETHANE DYESTUFFS

[75] Inventors: Karl-Heinz Hermann, Leverkusen; Hans-Lothar Dorsch, Cologne, both of Fed. Rep. of Germany

[73] Assignee: Bayer Aktiengesellschaft, Leverkusen, Fed. Rep. of Germany

[21] Appl. No.: 748,480

[22] Filed: Dec. 8, 1976

[30] Foreign Application Priority Data

Dec. 11, 1975 [DE] Fed. Rep. of Germany ....... 2555747

[51] Int. Cl.³ .............................................. C09B 11/10
[52] U.S. Cl. .................................. 260/391; 260/390; 260/392; 260/393; 260/394
[58] Field of Search ............... 260/390, 391, 393, 392, 260/394

[56] References Cited

U.S. PATENT DOCUMENTS

| | | | |
|---|---|---|---|
| 2,429,081 | 10/1947 | Steuber | 260/391 |
| 3,211,757 | 10/1965 | Schäfer et al. | 260/394 X |
| 3,671,553 | 6/1972 | Papenfuss et al. | 260/392 |
| 3,679,713 | 7/1972 | Feldman et al. | 260/393 X |
| 3,686,233 | 8/1972 | Gordon et al. | 260/391 |

*Primary Examiner*—Patrick Garvin
*Assistant Examiner*—Raymond K. Covington
*Attorney, Agent, or Firm*—Sprung, Felfe, Horn, Lynch & Kramer

[57] ABSTRACT

Process for isolating dyestuffs of the formula

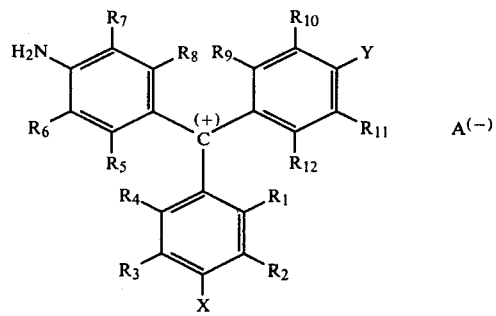

wherein
$R_1$–$R_{12}$ denote hydrogen, alkyl, halogenoalkyl, halogen, alkoxy, alkylmercapto, alkylsulphonyl, alkoxysulphonyl, alkylcarbonyl, alkoxycarbonyl, nitro or cyano, X and Y denote

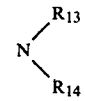

and
$R_{13}$ and $R_{14}$ denote hydrogen, alkyl, halogenoalkyl, cyanoalkyl, cycloalkyl, aryl or aralkyl, and wherein
X and $R_2$, Y and $R_{10}$, $R_1$ and $R_2$, $R_5$ and $R_6$ and $R_9$ and $R_{10}$ can form a 5- or 6-membered ring and $A^{(-)}$ denotes an anion,
by dissolving the crude dyestuffs, which have been obtained by known processes, in aqueous acids, adding an organic solvent which is immiscible with water or of limited miscibility with water and then isolating the dyestuffs in a known manner.

7 Claims, No Drawings

PROCESS FOR ISOLATING TRIARYLMETHANE DYESTUFFS

The subject of the invention is a process for isolating dyestuffs of the general formula

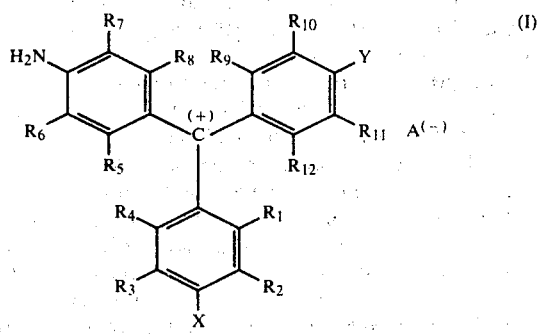

wherein $R_1-R_{12}$ independently of one another denote hydrogen, alkyl, halogenoalkyl, halogen, alkoxy, alkylmercapto, alkylsulphonyl, alkoxysulphonyl, alkylcarbonyl, alkoxycarbonyl, nitro or cyano, X and Y independently of one another denote

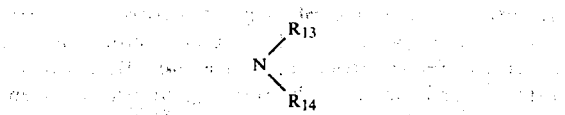

and $R_{13}$ and $R_{14}$ independently of one another denote hydrogen, alkyl, halogenoalkyl, cyanoalkyl, cycloalkyl, aryl or aralkyl, and wherein X and $R_2$, Y and $R_{10}$, $R_1$ and $R_2$, $R_5$ and $R_6$, and $R_9$ and $R_{10}$ can form a 5-membered or 6-membered ring and $A^{(-)}$ denotes an anion, in a tinctorially and technically pure form.

The process consists in dissolving the crude dyestuffs, which have been obtained by known processes, in aqueous acids, adding to the solutions an organic solvent which is immiscible with water or of limited miscibility with water and then isolating the dyestuffs from the aqueous solution in a known manner.

In formula (I), alkyl radicals are to be understood as, in particular, $C_1-C_4$-alkyl radicals. The alkyl radicals carry, for example, 1-3 of the substituents mentioned.

Halogen is to be understood as, preferably, fluorine, chlorine or bromine.

Suitable cycloalkyl radicals are, in particular, an optionally substituted cyclopentyl or cyclohexyl radical.

Suitable aryl radicals are, in particular, an optionally substituted phenyl or naphthyl radical.

Suitable aralkyl radicals are, in particular, an optionally substituted benzyl or $\beta$-phenylethyl radical.

These isocyclic compounds can carry, for example, 1-3 substituents, such as halogen, $C_1-C_4$-alkyl or $C_1-C_4$-alkoxy.

The substituents X and $R_2$, and/or Y and $R_{10}$, together with the benzene ring, form, for example, a tetrahydroquinoline or an indoline ring and the substituents $R_1$ and $R_2$, $R_5$ and $R_6$, and/or $R_9$ and $R_{10}$, together with the benzene ring, form, for example, a naphthalene ring.

A group of dyestuffs which can be prepared preferentially by the new process are those of the formula (I) in which the substituents $R_1$, $R_4$, $R_5$, $R_8$, $R_9$, $R_{12}$, $R_{13}$ and $R_{14}$ represent hydrogen.

Dyestuffs to be singled out from this group are, in turn, those in which the substituents $R_2$, $R_6$ and $R_{10}$ also represent hydrogen and in which the substituents $R_3$, $R_7$ and $R_{11}$ denote hydrogen or $C_1-C_4$-alkyl, especially methyl.

The anion is determined by the process of preparation. In general, the dyestuffs are in the form of halides, in particular chlorides or bromides. The anions can be exchanged for other anions in a known manner.

By an organic solvent which is immiscible with water or of restricted miscibility with water, there are to be understood, in particular, those organic solvents which have a solubility in water of up to 5%. Mixture of these solvents can also be used.

Examples which may be mentioned are: saturated and unsaturated aliphatic hydrocarbons, especially those with 4-12 C atoms, such as hexane, octane, isooctane, dodecane or hexane; cycloaliphatic hydrocarbons, especially cyclopentane, cyclohexane or decalin, or their derivatives which are substituted by 1-3 $C_1-C_4$-alkyl radicals; aromatic and fused aromatic-cycloaliphatic hydrocarbons, especially benzene, naphthalene or tetralin, or their derivatives which are substituted by 1-3 $C_1-C_{12}$-alkyl radicals, such as toluene, xylene, ethylbenzene, diethylbenzene, cumene, diisopropylbenzene, trimethylbenzene, butylbenzene, dodecylbenzene, biphenyl or methylnaphthalene; halogenated hydrocarbons, which preferably are derived from saturated or unsaturated hydrocarbons with 1-4 carbon atoms or from the abovementioned aromatic or cycloaliphatic hydrocarbons and can be substituted by, for example, 1-4 halogen atoms, such as chlorine or bromine, for example carbon tetrachloride, chloroform, methylene chloride, dichloroethylene, dichloroethane, perchloroethylene, tetrachloroethane, chlorobenzene, dichlorobenzene, chlorotoluene, bromobenzene, dibromobenzene, bromotoluene or chloronaphthalene; ethers, which can be symmetrical or unsymmetrical and open-chain or cyclic and which are derived, in particular, from the abovementioned hydrocarbons, such as anisole, phenetole, di-n-hexyl ether or diphenyl ether; and alcohols, in particular those which are derived from the abovementioned aliphatic hydrocarbons, such as hexanol, octanol and dodecanol.

The synthesis of the triarylmethane dyestuffs of the formula (I) is carried out in a known manner by reacting 2 or 3 mols of aromatic amines, which can be identical or different and have the formula

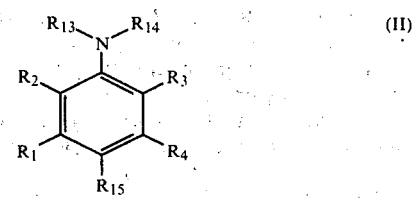

in which $R_1-R_4$, $R_{13}$ and $R_{14}$ have the abovementioned meaning and $R_{15}$ represents hydrogen, methyl, halogenomethyl with 1-3 halogen atoms, hydroxymethyl, formyl or the groups

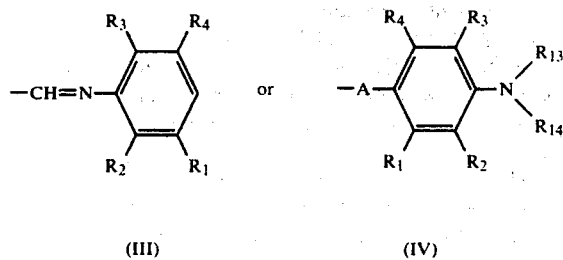

in which

A can be CO, CH$_2$ or CH—R$_{16}$ and

R$_{16}$ denotes hydroxyl, C$_1$–C$_4$-alkoxy, amino, mono- or di-C$_1$–C$_{14}$-alkylamino or halogen, in the presence of an oxidising agent and an oxidation catalyst at temperatures of between 110° and 190° over a period of between 4 and 24 hours, the reaction being catalysed by mineral acids or Lewis acids.

When choosing the amines, attention must be paid to the fact that, in order to supply the central C atom of the triarylmethane dyestuffs, it is necessary either for R$_{15}$ to differ from hydrogen in one mol of the amine or, if R$_{15}$ is hydrogen for all the amines, to add one mole of a substance which supplies the central C atom. Substances mainly used for this purpose are methanol, formaldehyde, formic acid, mono-, di-, tri- and tetra-halogenomethane or the N-methylene, N-formyl, N-methyl or N,N-dimethyl derivatives of the abovementioned amines, which, under the oxidising reaction conditions, eliminate molecules which can be incorporated into the triarylmethane skeleton. Furthermore, the procedure employed when making up the reaction mixture must be such that R$_{15}$ differs from hydrogen in at most one mol of amine. If R$_{15}$ in one mol of amine is one of the groupings III or IV, it is necessary to add only a second mol of an amine of the abovementioned formula. For all other radicals R$_{15}$, a total of 3 mols of amine are employed in the melt.

Catalysts which can be used are either mineral acids, such as hydrochloric acid, hydrobromic acid, phosphoric acid or sulphuric acid, or Lewis acids, such as ZnCl$_2$, BF$_3$, CdCl$_2$, AlCl$_3$ or MnCl$_2$.

Suitable oxidising agents are, for example, aromatic nitro compounds, preferably those of the formula

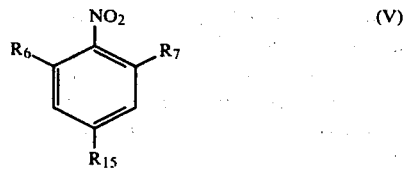

in which R$_6$, R$_7$ and R$_{15}$ have the abovementioned meaning. These compounds have the advantage that they are converted, on reduction, into amines which are suitable for incorporation into the triarylmethane skeleton. Further suitable oxidising agents are arsenic acid, antimonic acid, manganese dioxide, chloranil or air.

Oxidation catalysts which can be employed are FeCl$_2$, Fe$_2$O$_3$, CuO, ammonium metavanadate or the cobalt complex of the azomethine obtained from 1,2-diaminoethane and 2 mols of salicylaldehyde.

These customary syntheses for triarylmethane dyestuffs are known from, for example: J.T. Scanlan, J. Am. Chem. Soc. 57 (1935) page 887 and 58 (1936) page 1,427, Fiat 1313, II, page 330, U.S. Pat. No. 2,542,544 and German patent specifications Nos. 7,991, 16,766, 19,484, 59,775, 61,146, 66,125, 67,013, 93,540, 270,930 and 397,823.

All of these reactions lead to a number of bi-products, such as yellow acridine and phenazine dyestuffs or more highly condensed brown to black compounds, which have to be separated off during the isolation of the triarylmethane dyestuffs.

Since the properties of the bi-products are very similar to those of the triarylmethane dyestuffs, they can be separated off only with great difficulty.

Hitherto, the purification process has been carried out in such a way that the amines and nitro compounds which have not condensed are distilled off with steam or, if the reaction mixture contains no nitro compounds, the amines are dissolved in a dilute aqueous acid and separated off from the remaining components of the reaction mixture by filtration. The triarylmethane dyestuff is then extracted from the residue using acids, at temperatures between 20° and 100° C. During this extraction a proportion of the yellow and brown bi-products which have formed also goes into solution and a proportion remains undissolved and is separated off by filtration. The pH value of the extraction solution is between 0.1 and 7, depending on the volume and the temperature. The dyestuff is isolated from the extraction solution by cooling the solution, raising the pH value with bases, or by adding sodium chloride or by using a combination of the three operations just mentioned.

With this method of isolation it is not possible, even after further conventional purification methods, such as recrystallisation, to obtain the triarylmethanes in adequate yield and free from bi-products which shift the colour shade towards more yellow and duller shades.

It has now been found, surprisingly, that the triarylmethane dyestuffs can be isolated in high yield and free from yellow and dark bi-products which render them dull when a solvent which is immiscible with water or of limited miscibility with water is added, for example, in an amount of 2–200, and preferably 5–100, percent by volume, to the acid aqueous solution of the crude product which has been obtained from the synthesis, at temperatures of between 20° and 100° C. and at a pH value of between 0.1 and 7, and especially of between 0.1 and 4, and at a dyestuff concentration of, preferably, 5–250 g/l, and especially 5–100 g/l, this addition optionally being made after starting materials have been removed as described above, by steam distillation or dissolving in a dilute acid, and the dyestuff is then isolated from the aqueous phase as described above. The dyestuff is obtained in a crystalline form.

Dyeings with triarylmethane dyestuffs isolated in this way are clearer and more blue than those with dyestuffs isolated in the conventional manner. The purification effect achieved in this way is unusual and surprising, since the yellow and brown to black bi-products separated off are not soluble, or are only very slightly soluble, in the organic phase; they are found in the aqueous phase of the filtrate in a concentration which is far higher than that obtained using the method of working up without organic solvents.

The parts mentioned in the examples are parts by weight.

EXAMPLE 1

1,000 Parts of hot water are added to 262 parts of a product mixture obtained, in accordance with a process described by J. T. Scanlan, J. Am. Chem. Soc. 57 (1935) pages 887–892, by melting 56 parts of o-toluidine, 75 parts of o-toluidine hydrochloride, 36 parts of as-m-xylidine, 82 parts of o-nitrotoluene and 12 parts of iron chloride, and the resulting mixture is subjected to steam distillation in order to remove the amines and nitro compounds. The solution, which has a volume of 1 liter, is then acidified to pH 2.0–2.7 with 10 parts of concentrated HCl and filtered hot. 250 Parts of chlorobenzene are added to the hotfiltrate and the mixture is cooled slowly. The precipitation is completed by slowly adding NaCl. 68 Parts of a dyestuff of the formula

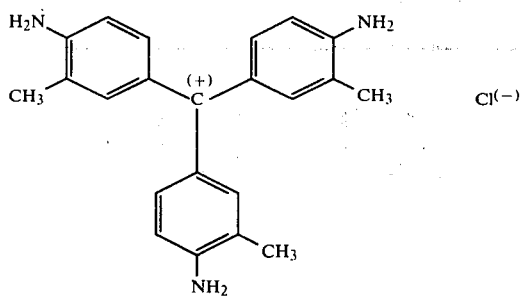

which is free from yellow impurities or impurities which render it dull and which gives particularly clear blue dyeings on polyacrylonitrile and acid-modified polyester fibres, are obtained.

EXAMPLE 2

In accordance with the literature reference cited in Example 1, 239 parts of a mixture obtained by melting 49 parts of aniline, 68 parts of aniline hydrochloride, 36 parts of as-m-xylidine, 74 parts of nitrobenzene and 12 parts of iron-II chloride are worked up as described above.

17 Parts of a dyestuff of the formula

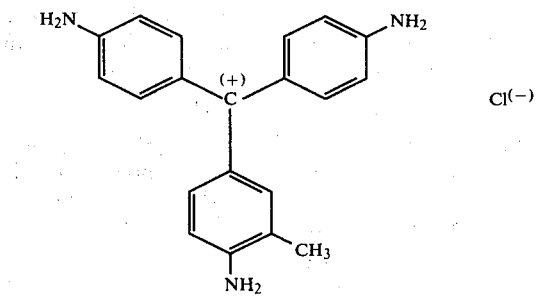

of outstanding quality are obtained. The dyestuff dyes polyacrylonitrile and acid-modified polyester fibres in shades which are clearer and more blue than does the product isolated without chlorobenzene.

The dyestuffs indicated in the table which follows, which are of good quality, can be obtained by varying the starting materials.

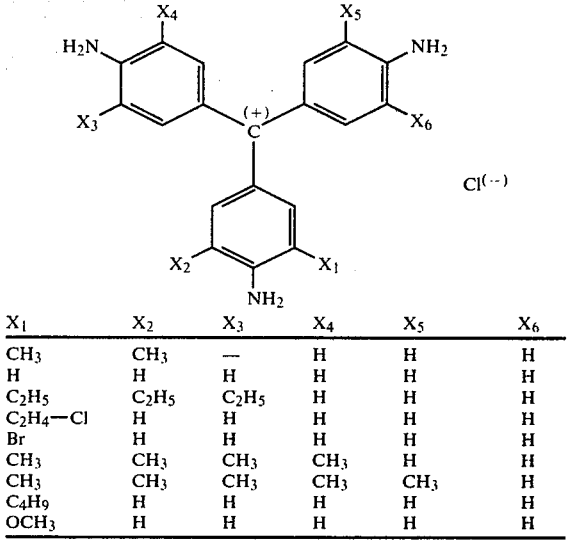

| $X_1$ | $X_2$ | $X_3$ | $X_4$ | $X_5$ | $X_6$ |
|---|---|---|---|---|---|
| $CH_3$ | $CH_3$ | — | H | H | H |
| H | H | H | H | H | H |
| $C_2H_5$ | $C_2H_5$ | $C_2H_5$ | H | H | H |
| $C_2H_4$—Cl | H | H | H | H | H |
| Br | H | H | H | H | H |
| $CH_3$ | $CH_3$ | $CH_3$ | $CH_3$ | H | H |
| $CH_3$ | $CH_3$ | $CH_3$ | $CH_3$ | $CH_3$ | H |
| $C_4H_9$ | H | H | H | H | H |
| $OCH_3$ | H | H | H | H | H |

EXAMPLE 3

170 Parts of a melt are obtained by melting 28 parts of aniline, 49 parts of a mixture of toluidine (24% of p-toluidine, 74% of o-toluidine and 2% of m-toluidine), 3 parts of p-toluidine, 43 parts of a mixture of nitrotoluene (24% of p-nitrotoluene, 74% of o-nitrotoluene and 2% of m-nitrotoluene), 2.5 parts of p-nitrotoluene, 26.3 parts of zinc chloride and 26.5 parts of iron-II chloride in accordance with Fiat 1313 II, page 330 and, after cooling, this melt is ground and, in order to remove the amines which have not condensed, is stirred with 1,600 parts of water and 46 parts of concentrated hydrochloric acid and the mixture is then filtered. The residue is stirred with 1,400 parts of water and 190 parts of concentrated hydrochloric acid, whereupon the dyestuff and a proportion of the bi-products go into solution. After filtering, 400 ml of chlorobenzene are added and the dyestuff is filled out by slowly adding a base. 46 Parts of a dyestuff of the formula

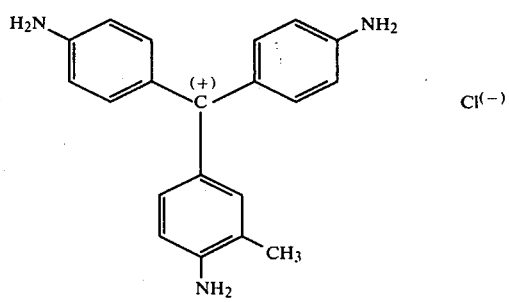

which is of such good quality that a further purification step is not necessary, are obtained.

EXAMPLE 4

850 Parts of a melt are obtained, as in East German patent specification No. 59,775, by melting 100 parts of anhydroformaldehyde-o-toluidine, 500 parts of o-toluidine hydrochloride, 100 parts of o-toluidine, 120 parts of o-nitrotoluene, 10 parts of iron and 30 parts of iron chloride and this melt is subjected to steam distillation and then filtered hot. The filtrate is made up to 3 liters with water and adjusted to a pH value of 2.5–3.0. 300 ml of chlorobenzene are added to the hot solution and the mixture is cooled slowly. Precipitation of the dyestuff is completed by adding NaCl. 205 Parts of a dyestuff of the formula

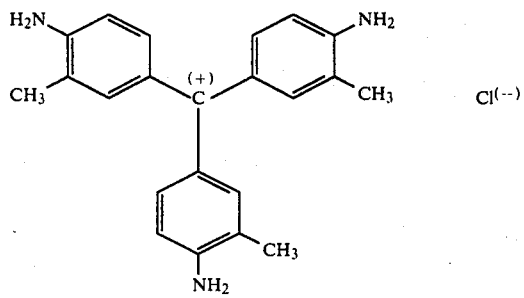

which is of outstanding quality, are obtained.

EXAMPLE 5

In accordance with U.S. Pat. No. 2,549,544, 70 parts of concentrated hydrochloric acid are added to 300 parts of aniline and the mixture is then dehydrated. 0.15 Part of a catalyst which is formed by heating sodium metavanadate in acetic anhydride are then added. Dry air is then passed through the reaction mixture at 110°–118° C. After steam distillation, the mixture is acidified to pH 2.5–3.5 with hydrochloric acid, made up to 500 ml with water and filtered hot. Chlorobenzene is then added to the hot filtrate and the dyestuff is isolated by cooling and adding NaCl. 33 Parts of a dyestuff of the formula

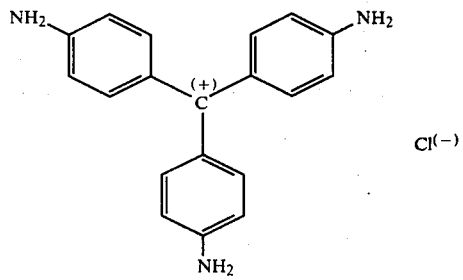

are obtained. The dyestuff is of outstanding quality and dyes polyacrylonitrile and acid-modified polyester fibres in very clear red-violet shades.

EXAMPLE 6

205.5 Parts of a melt obtained, by the process in the literature reference cited in Example 1, by heating 45 parts of 3,3'-dimethyl-4,4'-diaminodiphenylmethane, 107 parts of o-toluidine, 21.5 parts of o-toluidine hydrochloride, 22 parts of o-nitrotoluene and 10 parts of iron-II chloride, are subjected to steam distillation, acidified with hydrochloric acid and filtered hot. The filtrate is acidified to pH 2.5–3 and made up to 800 ccm with water, 400 ccm of chlorobenzene are added to the hot solution and the mixture is cooled slowly. The precipitation of the dyestuff is completed by adding NaCl. 17 Parts of a dyestuff of the formula

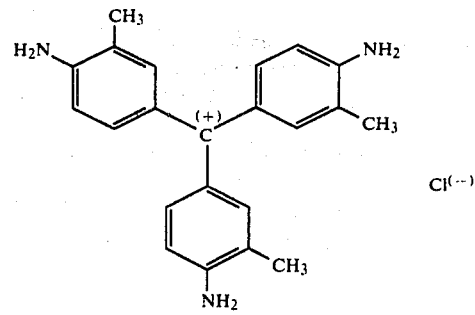

which dyes polyacrylonitrile and acid-modified polyester fibres in very clear red-violet shades, are obtained.

The dyestuffs indicated in the table which follows, which are of good quality, can be obtained by varying the starting materials.

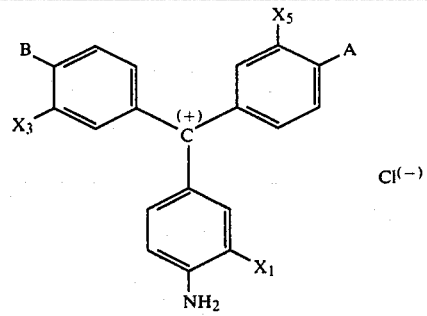

| $X_1$ | $X_3$ | $X_5$ | A | B |
|---|---|---|---|---|
| H | H | H | $N(CH_3)_2$ | $N(CH_3)_2$ |
| $CH_3$ | $CH_3$ | $CH_3$ | $N(CH_3)_2$ | $N(CH_3)_2$ |
| $CH_3$ | H | H | $N(C_2H_5)_2$ | $N(C_2H_5)_2$ |
| $CF_3$ | H | H | $NH-CH_3$ | $NH-CH_3$ |
| H | H | H | $NH-\text{Ph}$ | $NH-\text{Ph}$ |
| H | H | H | $N(C_2H_4-Cl)_2$ | $N(C_2H_4-Cl)_2$ |
| H | H | H | $NH_2$ | $NH_2$ |

EXAMPLES 7–12

The procedure is as in Examples 1–6 but, in place of chlorobenzene, an equal amount of o-dichlorobenzene is employed. The dyestuffs, which are isolated in similarly good yields, are of the same good quality.

EXAMPLES 13–19

The procedure is as in Examples 1–6, but the chlorobenzene is replaced by an equal amount of 1,2-dichloroethane. The dyestuffs, which are obtained in good yields, are of the same good quality.

EXAMPLES 19–24

Results similar to those in Examples 1–6 are obtained when the chlorobenzene is replaced by an equal amount of carbon tetrachloride.

EXAMPLES 25–30

If, in the process described in Examples 1–6, the chlorobenzene is replaced by an equal amount of toluene, products of equally good quality are obtained in similarly good yields.

We claim:

1. A process for purifying a crude dyestuff salt of the formula

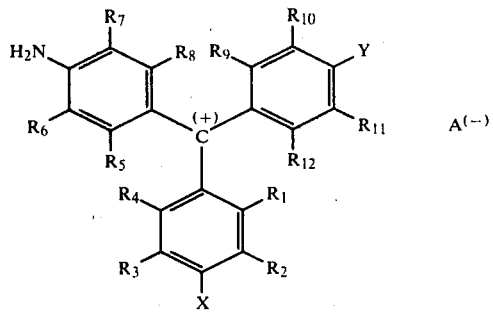

wherein $R_1$–$R_{12}$ independently of one another denote hydrogen, alkyl, halogenoalkyl, halogen, alkoxy, alkylmercapto, alkylsulphonyl, alkoxysulphonyl, alkylcarbonyl, alkoxycarbonyl, nitro or cyano;

X and Y independently of one another denote

and $R_{13}$ and $R_{14}$ independently of one another denote hydrogen, alkyl, halogenoalkyl, cyanoalkyl, cycloalkyl, aryl or aralkyl; and wherein X and $R_2$, Y and $R_{10}$, $R_1$ and $R_2$, $R_5$ and $R_6$, and $R_9$ and $R_{10}$ can form a 5-membered or 6-membered ring; and $A^{(-)}$ denotes an anion;

consisting essentially of adding to an acid aqueous solution of the dyestuff salt an organic solvent immiscible with water or of limited miscibility with water or a mixture of such solvents and then recovering the dyestuff salt in purified form from the solution.

2. Process according to claim 1 for isolating dyestuffs of the formula

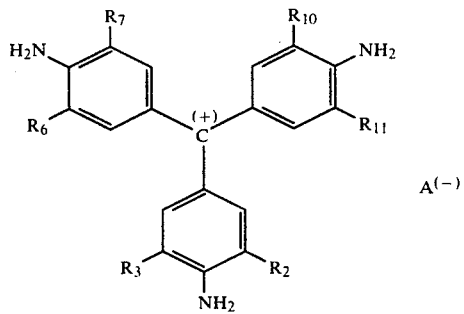

wherein $R_2$, $R_3$, $R_6$, $R_7$, $R_{10}$, $R_{11}$ and $A^{(-)}$ have the meaning indicated in claim 1.

3. Process according to claim 1 for isolating dyestuffs of the formula

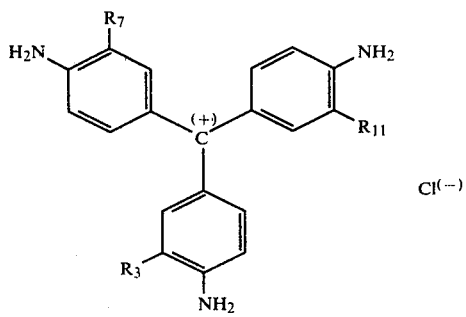

wherein $R_3$, $R_7$ and $R_{11}$ denote hydrogen or $C_1$–$C_4$-alkyl.

4. Process according to claim 1, characterised in that the organic solvent employed is a saturated or unsaturated aliphatic hydrocarbon, a cycloaliphatic, aromatic or condensed aromatic cycloaliphatic hydrocarbon, a saturated or unsaturated aliphatic or aromatic halogenated hydrocarbon, an aliphatic, aromatic or aliphatic-aromatic ether or an aliphatic alcohol, or mixtures thereof.

5. Process according to claim 1, characterised in that the organic solvent employed is a saturated or unsaturated aliphatic halogenated hydrocarbon with 1–4 C atoms and 1–4 halogen atoms, especially chlorine atoms, or a halogenobenzene with 1–4 halogen atoms, especially chlorine atoms, and optionally 1–4 $C_1$–$C_{12}$-alkyl radicals.

6. Process according to claim 1, characterised in that the organic solvent employed is 1,2-dichloroethane, carbon tetrachloride, chlorobenzene or o-dichlorobenzene.

7. The process of claim 1, wherein the acid aqueous dyestuff salt solution has a dyestuff salt concentration of 5 to 250 g/l, and the organic solvent or solvent mixture is added to the solution at a temperature of between 20° and 100° C. and a pH value of between 0.1 and 7.

* * * * *